United States Patent [19]

DeVoss

[11] 3,773,238
[45] Nov. 20, 1973

[54] BACKUP WEDGE DEVICE FOR A FASTENER INSTALLING MACHINE

[75] Inventor: Edwin A. DeVoss, Torrance, Calif.

[73] Assignee: Northrop Corporation, Los Angeles, Calif.

[22] Filed: Apr. 26, 1972

[21] Appl. No.: 247,769

[52] U.S. Cl. .............................................. 227/61
[51] Int. Cl. ............................................ B21j 15/10
[58] Field of Search ...................... 227/61, 62, 140, 227/153, 154

[56] References Cited
UNITED STATES PATENTS

| | | | |
|---|---|---|---|
| 2,244,047 | 6/1941 | Butter | 227/154 X |
| 2,216,043 | 10/1940 | Oeckl et al. | 227/61 X |
| 3,030,833 | 4/1962 | Siegel et al. | 227/61 |

*Primary Examiner*—Granville Y. Custer, Jr.
*Attorney*—William W. Rundle et al.

[57] ABSTRACT

An automatic drilling and riveting machine or the like is provided with a movable mechanical blocking member between the hydraulic lower ram and the air pressure operated lower work clamping member riding thereon. A block driving member in the form of a wedge is movable into and out of engagement with the block to raise it and mechanically lock the clamping member against the work after the upward clamp-up motion of the ram and clamping member is completed. This provides a positive backup force for the insertion of interference-fit fasteners forced through the work, without causing excessive clamping forces on the work pieces which would mark or distort them. The movable block member can be omitted when a cooperating tapered wedge surface is formed on one of the existing machine parts. The full specification must be consulted for an understanding of the invention.

10 Claims, 8 Drawing Figures

PATENTED NOV 20 1973

PATENTED NOV 20 1973 3,773,238

BACKUP WEDGE DEVICE FOR A FASTENER INSTALLING MACHINE

The present invention relates to fastener installing machines, and more particularly, to the improvement of automatic machines wherein a threaded fastener is forced into an interference-fit hole in a work piece.

Automatic Drivmatic riveting machines are used to clamp work pieces, drill a hole, install a threaded bolt through the hole from the top, and install and tighten a nut on the bolt end from the lower end. Drivmatic is a commonly known name of automatic drilling and riveting machines manufactured by General Electromechanical Corporation, Buffalo, N.Y. 14207.

In many applications of aircraft work, for example, it is desired to use steel or titanium lock bolt pins which are forced into a precision drilled hole which is two to three thousandths inch smaller than the shank portion of the bolt. For a 3/16-inch bolt, up to 2,500 pounds of force is required to press in the bolt. However, the normal riveter machine clamp-up force exerted from underneath the work is only around 800 to 1,000 pounds, which results in the work piece being pushed away under the 2,500 pound insertion force, thereby leaving the lock bolt only partially pressed into the hole.

One attempted solution to the above problem has been to provide a hydraulic booster which gives a 3,000 pound clamping force on the work pieces. However, this has not been satisfactory since 3,000 pounds is excessive and marks, dimples or cans the work, especially the outside of an Alclad surface, for example, thus causing rejected parts. For ¼-inch or larger bolts, the required force is even higher, thereby making this solution highly unsatisfactory.

Therefore, it is an object of this invention to provide a positive back-up to withstand the required high bolt-insertion force (2,500 to 3,000 or more pounds, for example), without necessitating a high clamping force which will mark or distort the parts.

Another object of the present invention is to provide a solution to the above-named problems which is adaptable to various types and sizes of machinery.

The conventional Drivmatic riveting machines used for the subject type of work normally includes a vertically movable hydraulic lower ram with a force capacity of 16,000 pounds for example, coupled with a coaxially acting air-pressure operated clamping sleeve member which contacts the bottom of the work pieces and has a small limited vertical movement with respect to the hydraulic cam cylinder. The upper side of the work is solidly contacted by a pressure foot. The shop air pressure or limit switches in the machine may be adjusted to regulate the clamping force to about 800 to 1,000 pounds for example, so that when the lower ram is raised until the clamping member touches and clamps the work, the hydraulic ram travels a small amount farther relative to the clamping member, with the actual clamping force not being greater than what is produced by the air pressure. Thus the clamping force is limited to about 900 pounds for instance.

Briefly, my invention comprises a reciprocating blocking member or assembly which will move into place supported solidly by the lower ram cylinder and coming into contact at its upper surface with an abutting surface provided on the lower clamping member to hold the latter solidly up in place against the work pieces. This lock motion is properly sequenced with the automatic machine controls to occur after the lower ram assembly and clamping member having ended their upward travel and before the interference-fit bolt is installed. Then when the bolt or other fastener member is pressed down through the hole in the work by an upper anvil, the 2,500 pound or more insertion force is solidly and rigidly opposed through the blocking member to the lower ram itself which is incompressible.

Preferably, either a separate block with a mating wedge member may be provided, or the bottom structure of the lower clamping member may be modified to form a mating wedge surface in it, as will be described later. The wedge-shaped member may be bifurcated to fit around the lower anvil member, and a fluid pressure cylinder and piston assembly is preferably provided to actuate the wedge into and out of operating position.

Alternatively, other blocking structure such as a rack and gear-operated screw jack arrangement can be incorporated as the blocking means.

This invention will be more fully understood from the detailed description of specific apparatus to follow, and to the accompanying illustrative drawings, wherein:

FIG. 1 is a front elevation view, partly diagrammatic, showing a locking wedge in place in a modified automatic type of drilling and riveting machine.

FIG. 2 is a top view, partly sectional, viewed as indicated by the line 2—2 in FIG. 1.

Figures 1, 2:
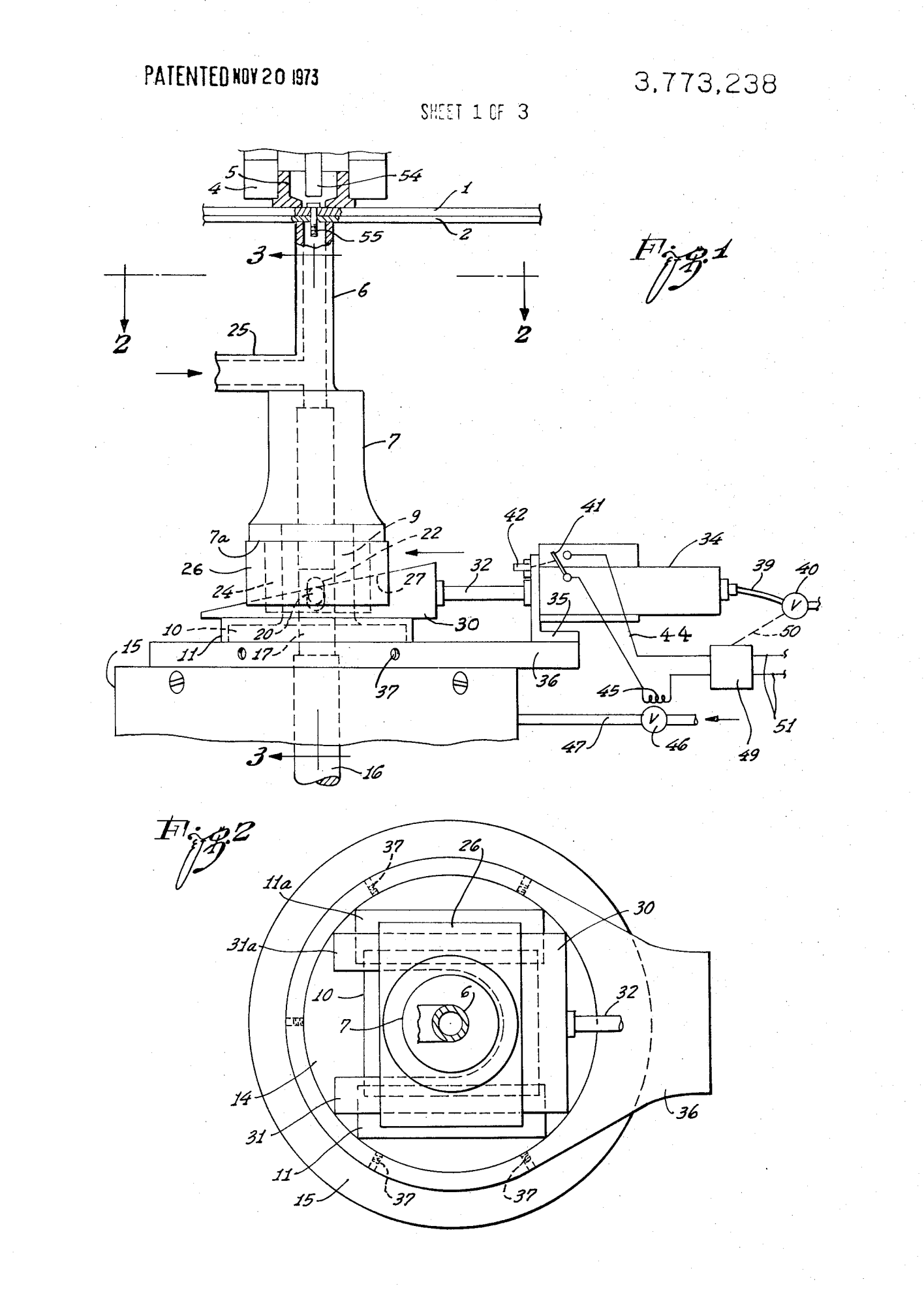
Figure 3:
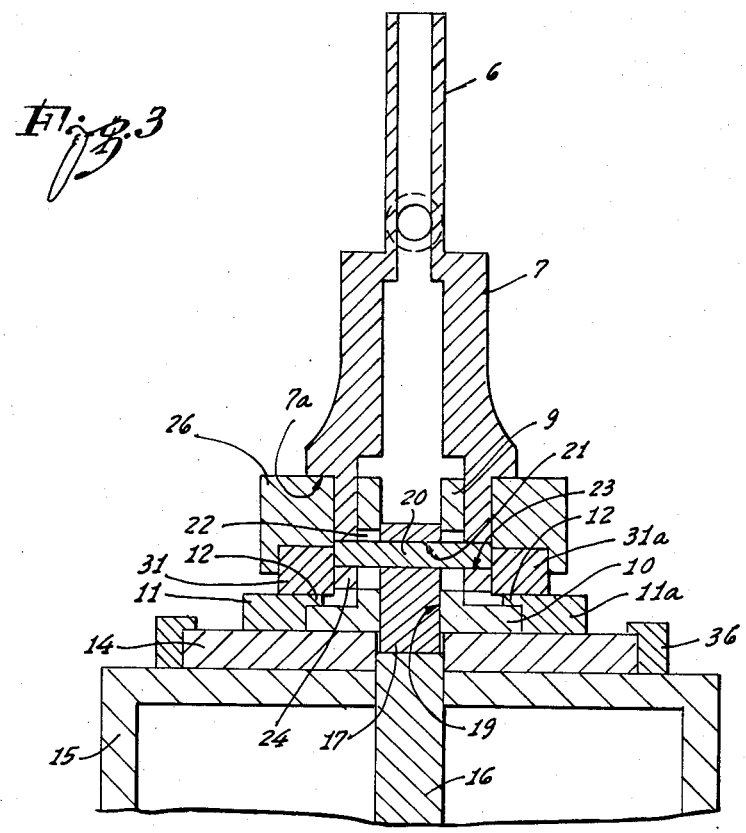
FIG. 3 is a longitudinal center-line sectional view, taken as indicated by the line 3-3 in FIG. 1.

Referring first to FIG. 1 for a detailed description of one form of may invention, the edges of two work pieces 1 and 2 to be fastened together are shown clamped between an upper pressure foot bracket 4 and bushing 5 and a lower anvil clamping sleeve 6 of a Drivmatic riveter. The sleeve 6 is integral with a lower housing 7 which can slide up and down a slight distance relative to an anvil post 9 and integral anvil base 10. Referring also to FIGS. 2 and 3, it will be seen that base 10 is held in place vertically by two parallel gibs 11 and 11a having flanges 12 overlapping the base 10. The gibs 11 and 11a are in turn secured to a circular top plate 14 mounted on a lower ram 15 which is actuated by a hydraulically operated cylinder.

Inside the ram 15 is an air operated piston rod 16, the upper end of which extends through an opening in the center of top plate 14 and contacts a plunger 17. The latter plunger 17 is vertically slidable in a bore 19 of the anvil post 9, which bore extends through the anvil base 10.

A pin 20 fits laterally through a hole 21 in the plunger 17, through a vertical slot 22 in the sides of the anvil post 9, and is seated at the ends in two aligned apertures 23 of a lower cylindrical projection 24 integral with the housing 7. A bottom abutment surface 7a is provided between projection 24 and the upper portion of housing 7. Thus the piston rod 16 and plunger 17 can move the clamping sleeve 6 and housing 7 only so far as the slot 22 permits, relative to the ram 15. As is known in the art, the ram cylinder can be raised or lowered by hydraulic fluid under control of valving, and the lower end of piston rod 16 is forced up by a piston (not shown) behind which compressed air is admitted.

The clamping sleeve 6 and associated air pressure operated elements ride up and down with the lower ram 15. The upward force of the ram 15 under hydraulic pressure is large, but the upward force of the clamping sleeve 6 alone under regulated air pressure, is designed to be relatively lower, say 800 to 1,000 pounds. Constructions vary, but the illustrated arrangement is typical of conventional automatic riveters, where in the present case the normal riveting anvil is absent and a nut feeding tube 25 is fed into the side of the hollow clamping sleeve 6. Air-operated nut-turning means operating along the center-line of the sleeve, also well known in the art, is omitted from the present showing for the purpose of clarity.

Figure 4:
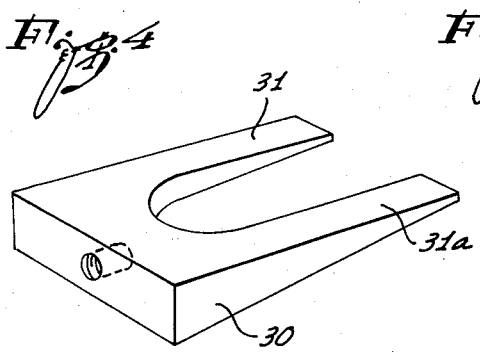
FIG. 4 is a perspective view of a wedge member suitable for use in FIG. 1 of the present invention.
Figure 5:
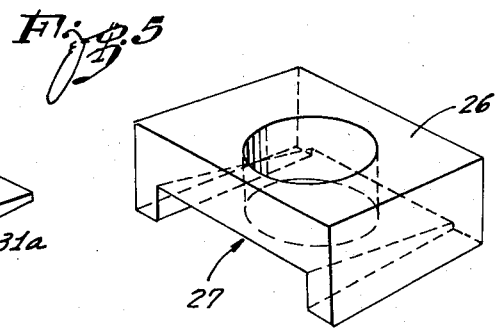
FIG. 5 is a perspective view of a block member designed to receive and be raised by the wedge member.

In this invention and further referring to FIG. 5, the conventional apparatus is modified to include a reaction block 26 slidable on and surrounding housing projection 24 beneath the abuttment surface 7a, and block 26 has a sloping ramp surface 27 in its lower end extending completely from the left to the right between the front and rear edges. The sloping surface 27 has an angle matching that of a block-driving wedge member 30 (FIG. 4) positioned to enter under the reaction block 26 from the right-hand side. The wedge 30 is bifurcated to form two parallel legs 31 and 31a sloping upward from the horizontal at a preferred angle of 12°. The legs extend for the majority of the length of the wedge member, and are joined together at the solid end of the wedge 30. These legs straddle the housing projection 24, the lower surfaces resting and slidable on gibs 11 and 11a, respectively, and the upper sloping surfaces contacting the lower ramp surface 27 of block 26 for the purpose of raising the block 26 when the wedge 30 is inserted from right to left.

A wedge actuating rod 32 is attached to the right-hand end of wedge 30, the rod 32 coming from an air cylinder assembly 34 mounted on a cylinder bracket 35. This bracket 35 is in turn fastened to a support ring 36 which is attached by set screws 37 to the exterior of the ram top plate 14. The air cylinder 34 and wedge 30 thus travel vertically with the ram 15 at all times.

Air supply line means 39 to air cylinder 34 is provided with a control valve 40 to govern the extension and retraction of the wedge actuating rod 32. In addition, a safety switch 41 is mounted on the cylinder bracket 35, with a switch plunger 42 in position to be contacted and pushed inwardly by the wedge 30 when the latter is in its completely retracted position. Switch 41 is of the normally open type and is closed only when wedge 30 is retracted. This safety switch 41 is wired in series with a circuit 44 to a solenoid 45 controlling opening of a hydraulic valve 46 in the "up" fluid line 47 of the cylinder of ram 15. Thus it will be seen that the ram 15 can be moved up only when the wedge 30 is withdrawn from contact with the block 26.

The solenoid valve circuit 44 is connected into a control box 49 of the Drivmatic machine, as is an operating connection 50 to the wedge air control valve 40. Control box 49 is supplied with input power leads 51 from an electrical power source (not shown), and contains the necessary control relays and the like for the entire operation of the machine. Suitable operation connections of the switch circuit 44 and the air valve 40 for the desired sequence of operation will be obvious to those skilled in the art.

Such a sequence of operation will now be described as necessary to explain fully the function and advantages of the present invention.

Figure 6:
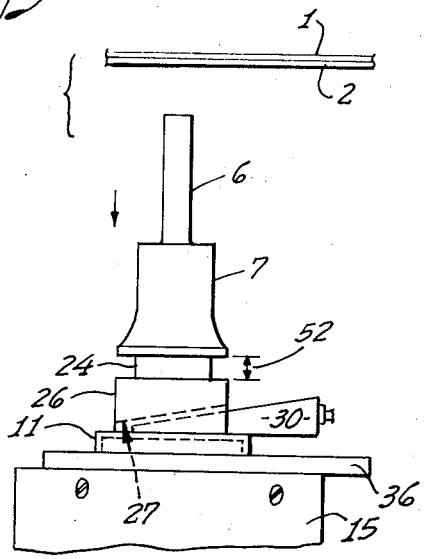
FIG. 6 is a simplified front view as FIG. 1, but showing the parts in a starting position before actuation and operation of the machine cycle.

The work pieces 1 and 2 are moved together into position above the clamping sleeve 6 where a fastener is to be installed. The ram 15 is initially down, and the wedge 30 is out of contact with the block 26 which now rests on the gibs 11 and 11a. This placement is shown in FIG. 6. The clamping sleeve 6 is at its uppermost position relative to the ram 15, due to the air pressure force pushing up on the internal piston rod 16 (FIG. 1), leaving a maximum space 52 as shown in FIG. 6. When now the "operate" switch (not shown) of the machine is actuated, a complete operating cycle will be automatically performed.

Figure 7:
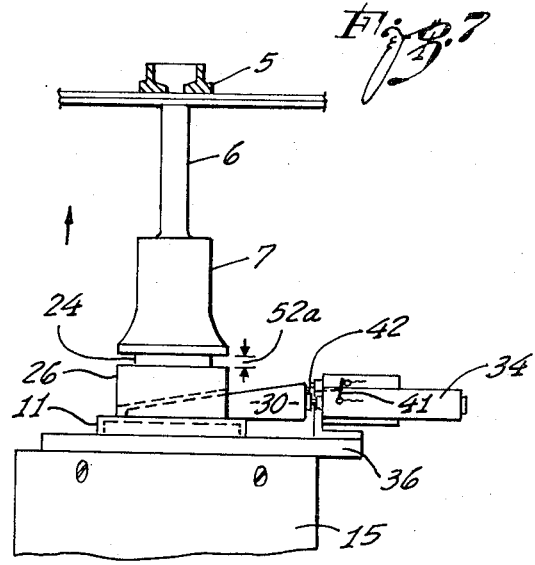
FIG. 7 is a view similar to FIG. 6, showing the pertinent parts after the raising of the lower ram and clamping of the work pieces, but before insertion of the wedge.

First, the safety switch 41 being closed, the lower ram 15 is driven up until contact is made between the clamp sleeve 6, work pieces, and the stationary upper pressure foot bushing 5. The clamp sleeve 6 now stops and the ram 15 continues for a short distance until the solenoid valve 46 is closed by mechanical machine contact with a micro-switch (not shown) which is a standard part generally located in the base of the machine. The ram 15 is now stopped and hydraulically locked, leaving a smaller space 52a, as shown in FIG. 7. During the time between the stopping of clamp sleeve 6 and ram 15, the anvil post 9 on top of ram 15 has risen slightly in the housing projection 24, compressing the trapped air in the clamp air cylinder (not shown) below piston rod 16.

The micro-switch mentioned in the preceding paragraph is adjustable to vary the relative distance that ram 15 moves after clamp sleeve 6 has stopped, which in turn can be used to slightly adjust the final trapped air pressure which determines the work clamping force. The work pieces are now clamped together with a force depending on the clamping air pressure; this force is about 800 to 1,000 pounds as mentioned earlier.

Now also a signal from the same position micro-switch that shut off the solenoid valve 46 normally actuates another machine circuit that moves down a rotating drill bit and drills a hole in the clamped material through which hole the interference-fit fastener is to be driven. The air control valve 40 can also be connected into the machine circuits to be actuated at this same time, moving the wedge 30 to the left under a designed force of approximately 10 pounds. The wedge 30 contacts and raises the block 26 by the sliding wedge action until the upper side of the block 26 contacts the housing abuttment 7a and stops. This wedge position is the one shown in FIG. 1 where it is seen that a solid back-up now positively supports the clamping sleeve 6 from moving downwardly. This is the important feature of the invention, i.e., the clamping sleeve 6 is solidly prevented from downward movement by a direct mechanical immovable support through the housing 7, block 26, wedge legs 31, gibs 11 and 11a, and top plate 14 to the ram 15 itself. The air pressure cushioning effect formerly provided by relative movement of the clamping sleeve 6 and anvil post 9 is now prohibited.

Standard automatic machine operation now raises the drill, shifts the drill head out of position and an upper anvil 54 (FIG. 1) into position over the hole, feeds a bolt 55 into the hole where the smaller-diameter threaded portion of the bolt drops into the drilled hole, and the upper anvil 54 descends with sufficient force to drive the bolt upper shank portion all the way in until the bolt head seats on the work pieces.

Further automatic machine operation, not a part of this invention, may now proceed to lift a nut from the nut feed tube 25 up through the center of the clamping sleeve 6 and spin the nut onto the bolt 55. When the nut installing mechanism (not shown) has retracted, a "return" signal is generated which accomplishes all the following substantially simultaneously: (a) lifts the upper anvil 54, (b) shifts the upper machine head back to where the drill is positioned above the clamp sleeve 6, (c) lowers the ram 15, and (d) retracts the air cylinder actuating rod 32 which withdraws the wedge 30 and allows the block 26 to drop. This completes one cycle, and the work is now free to be moved to the next spot for which a bolt is to be inserted and fastened.

In the particular machine operation just described, the wedge 30 was inserted right after the work "clamp-up" was completed and as the drill was coming down. It will be noted, however, that the wedge function is not actually required until just prior to descent of the upper anvil 54 to press in the bolt 55. Therefore, it is possible to actuate the wedge at any convenient time within this interval. For instance, the air cylinder operating connection 50 may be tied into the machine sequence when the drill lifts, or when the head shifts the upper anvil 54 laterally into bolt insertion position, for example. Further, the wedge 30 could be withdrawn at some different time from that described, such as while the nut is being installed. The exact timing depends upon what machine operations are being performed. The wedge 30 must be out, however, before the ram 15 begins its next upward stroke. If the wedge 30 were in its inserted position as the ram 13 raised to clamp the work, the whole 16,000 pounds, for example, of ram force would drive the clamping sleeve 6 into the work and ruin it, also damaging the machine equipment, since the wedge would be forming a solid link with the ram 15. Hence, the preference for the safety switch 41 as described, which must be closed as a fail-safe measure before the electrical circuit 44 can be completed to raise the ram 15.

The wedge angle of 12° is preferred since about 14° is the locking taper angle at which downward force of the block 26 will not cause an outward horizontal movement of the block-driving wedge 30. As mentioned before, only a 10-pound force is imparted to the wedge 30 when lifting the block 26. This will automatically add about 90 pounds to the air clamping force in the upward direction. Thus, if the air clamp force is adjusted to be 910 pounds, for example, the total clamp force when the wedge is in place will be about 1,000 pounds. Thin work may require a clamping force of only about 300 pounds, for example, to avoid damaging the parts. In that case, the air clamp cylinder pressure in the machine and the relative ram travel would be adjusted to cause only about 210 pounds. Then with the 90 pounds of wedge-added force, only 300 pounds total clamp force would be produced, while still providing the solid wedge support to withstand the bolt insertion force.

No high pressure marking or dimpling occurs on the parts or skins being processed, with the use of the mechanical backup of the present invention. This is because no high clamping force is resisted by the upper pressure foot bushing 5 on the upper work surface which in many cases is the smooth external skin surface of an airplane. Only the clamping force described herein is so applied to the upper work surface.

It is also to be noted that the wedge 30 will make support contact in the block 26 and thus stop wherever the air-loaded clamping sleeve 6 happens to settle out, thus automatically compensating for variations in work piece thickness. The bolts or threaded pins used as the fasteners may be of the protruding head type as illustrated by bolt 55 in FIG. 1, or have a beveled flat head to fit flush in a counter-sunk hole.

Figure 8:
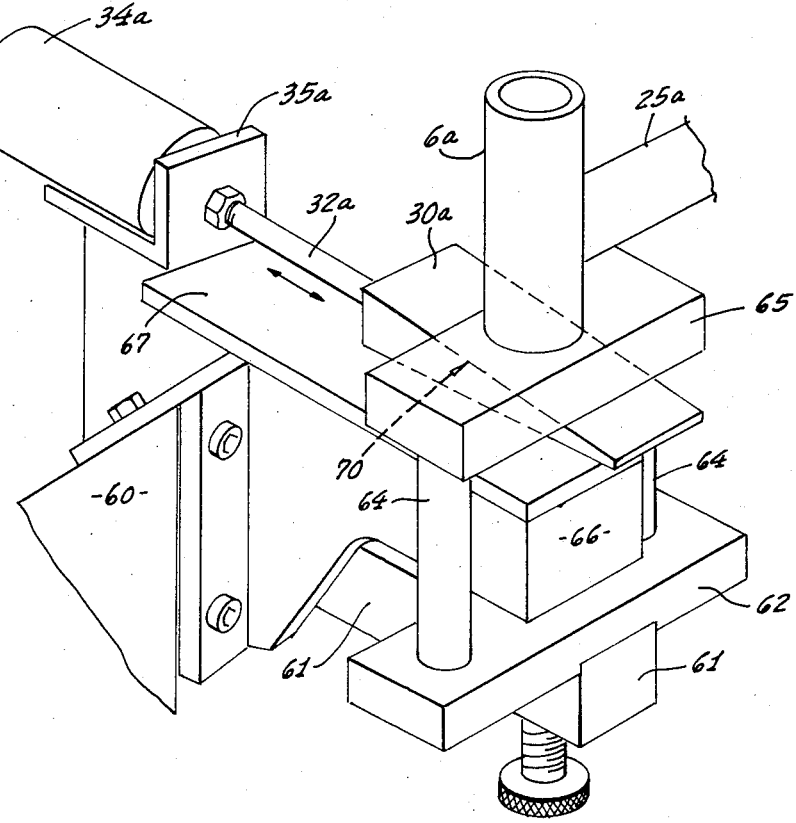
FIG. 8 is a simplified perspective view of the wedge invention as applied to a different form of machine construction.

The same principles and action of this invention may be incorporated in various specific designs for machines of different construction. If possible, simplification can be achieved by omitting the separate wedge reaction block 26 and by forming the reaction taper on a component already in the machine. Further, where no central single lower anvil component is necessary inside the clamping sleeve or housing attached thereto, the wedge 30 need not be bifurcated into two leg portions for the purpose of straddling such center component. Both the alternate expedients in this paragraph are illustrated in FIG. 8. This drawing shows only the pertinent parts of a certain pneudraulic riveter, including the basic lower portions of a 12,000 pound upset pneudraulic knee 60 (corresponding to the ram 15 of FIG. 1) and an air clamp bar 61 (corresponding to the piston rod 16 of FIG. 1).

In this machine of FIG. 8, the air clamp bar 61 has a closed loop-like structure attached to its upper side, including a lower cross bar 62, two spaced parallel compression rods 64 erected from the cross bar ends, and an upper cross bar 65 connected across the rods 64. A hollow lower anvil clamping sleeve 6a is attached vertically up from the center of the upper cross bar 65. An offset horn 66 from the pneudraulic knee 60 extends into and through the lateral space between the rods 64. Relative vertical motion occurs between the horn 66 and clamping sleeve 6a just as in the same action of the machine of FIG. 1.

On the upper side of horn 66 is fixed a wear plate 67 supporting a wedge 30a connected to an actuating rod 32a from an air cylinder 34a fastened to the machine knee 60 by an added cylinder support bracket 35a. The width of upper cross bar 65 is made sufficient to form in its bottom side an inclined channel 70 of the same inclination as the upper surface of wedge 30a. Thus it is seen that no separate sliding piece such as block 26 in FIG. 1 is utilized in the structure of FIG. 8, but the function remains the same. A safety switch can also obviously be installed on the apparatus of FIG. 8, similar to switch 41 in FIG. 1. After clamp-up of the work (not shown) atop clamping sleeve 6a, the wedge 30a is pushed into the space between the wear plate 67 and the inclined channel 70 to form a solid mechanical support under the clamping sleeve 6a.

The same press-fit bolt installation is accomplished by the FIG. 8 structure as previously described. Notice that the wedge 30a is solid instead of forked. Of course this solid wedge could not be possible if an upset anvil or some other part is mounted upwardly into sleeve 6a from the horn 66. However, a nut feed 25a and installation can be designed to fit in entirely above the solid wedge 30a. Other equivalent arrangements or modifications may also be employed.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. In an automatic drilling and riveting machine or the like having an upper anvil and a lower anvil including a relatively large-force hydraulic ram and a relatively small-force air cushioned clamping member mounted with the ram; the improvement for installing interference-fit fasteners through work pieces comprising: rigid wedge-shaped means movable to and from an operating position where it solidly takes up the space remaining between the ram and the clamping member, and wedge actuating means for moving said wedge means to said operating position after the work is clamped up at relatively low force and before the fastener is pressed through the work.

2. Apparatus in accordance with claim 1 including safety switch means positioned to be closed only when said wedge means is out of said operating position, said safety switch being required to be closed before the ram can be moved toward the work.

3. Apparatus in accordance with claim 1 wherein the wedge angle is not greater than approximately 14 degrees to prevent reverse movement of said wedge means under fastener installation forces.

4. Apparatus in accordance with claim 1 wherein said actuating means is fixed on structure movable along with said ram.

5. Apparatus in accordance with claim 1 wherein said wedge-shaped means comprises a first wedge-receiving member fitting loosely between said ram and said clamping member, and a second mating wedge member movable into and out of said wedge-receiving member perpendicularly to the direction of ram travel, and wherein said actuating means comprises a linear piston and cylinder combination connected by a rod to said second wedge member, and piston control means connected into the sequencing circuits of said machine.

6. Apparatus in accordance with claim 1 wherein said wedge-shaped means comprises a first wedge-receiving member fitting loosely between said ram and said clamping member and surrounding a post element attached to said ram, and a second mating wedge member movable into and out of said wedge-receiving member perpendicularly to the direction of ram travel, said mating wedge member being bifurcated to straddle said post element.

7. Apparatus in accordance with claim 1 wherein said wedge-shaped means comprises a block with a recessed tapered surface in one face thereof, and a forked wedge member having two parallel tapered legs matching the taper of said block to lift said block when said legs enter.

8. Apparatus in accordance with claim 1 wherein said wedge-shaped means comprises a tapered surface on a portion of said clamping member spaced from said ram in the direction of ram travel, and a wedge member having motion perpendicular to said direction and mating with said tapered surface.

9. Apparatus in accordance with claim 1 wherein said wedge-shaped means comprises a first member movable relative to said ram in the direction of ram travel, and a second member movable perpendicular to said direction and having a driving connection with said first member.

10. Apparatus for providing a solid backup support for an interference-fit fastener installing machine, comprising a wedge driving member, means mounting said driving member on the hydraulic ram of said machine, said driving member being actuable to move perpendicular to ram direction of travel, a wedge driven member mounted on said machine in line loosely with a space between said ram and an abutting portion of the air-pressurized work clamping means of said machine, and actuating means connected to said driving member to move said driving member into an operating position with respect to said driven member wherein said driving and driven members form a solid mechanical support in the space between said ram and said clamping means, whereby an immovable support is provided resisting the necessary force to press-fit a fastener all the way to a desired installed position.

* * * * *